(12) United States Patent
Braam et al.

(10) Patent No.: US 6,957,347 B2
(45) Date of Patent: Oct. 18, 2005

(54) PHYSICAL DEVICE PLACEMENT ASSISTANT

(75) Inventors: Kenneth F. Braam, Rochester, MN (US); Kim Annette Gilsdorf, Bellechester, MN (US); Nancy Mae Heinz, Rochester, MN (US); Daniel Arthur Johnson, Eyota, MN (US); Robert M. Kalar, Rochester, MN (US); Gary Michael Melbostad, Elgin, MN (US); Steven Jon Wahlstrom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 09/865,798

(22) Filed: May 25, 2001

(65) Prior Publication Data

US 2002/0178379 A1 Nov. 28, 2002

(51) Int. Cl.⁷ ................................................. H04L 9/00
(52) U.S. Cl. ........................................ 713/200; 713/201
(58) Field of Search ................................. 713/200–201, 713/1, 100; 709/200, 217, 220–221, 203, 202; 717/174, 176–178

(56) References Cited

U.S. PATENT DOCUMENTS

| | | | |
|---|---|---|---|
| 4,905,171 A | 2/1990 | Kiel et al. | 364/551.01 |
| 5,408,618 A | 4/1995 | Aho et al. | 395/325 |
| 5,627,766 A | 5/1997 | Beaven | 364/551.01 |
| 5,696,701 A | 12/1997 | Burgess et al. | 364/551.01 |
| 5,704,031 A | 12/1997 | Mikami et al. | |
| 5,758,071 A | 5/1998 | Burgess et al. | 395/200.5 |
| 5,796,633 A | 8/1998 | Burgess et al. | 364/551.01 |
| 5,826,000 A | * 10/1998 | Hamilton | 714/4 |
| 5,828,899 A | * 10/1998 | Richard et al. | 710/8 |
| 5,848,231 A | * 12/1998 | Teitelbaum et al. | 713/200 |
| 5,918,019 A | * 6/1999 | Valencia | 709/227 |
| 5,926,624 A | * 7/1999 | Katz et al. | 709/217 |
| 5,949,976 A | 9/1999 | Chappelle | 395/200.54 |
| 5,961,596 A | 10/1999 | Takubo et al. | 709/224 |
| 6,098,098 A | * 8/2000 | Sandahl et al. | 709/221 |
| 6,130,892 A | * 10/2000 | Short et al. | 370/401 |

(Continued)

OTHER PUBLICATIONS

U.S. Appl. No. 09/892,424, filed Jun. 27, 2001.
U.S. Appl. No. 09/892,435, filed Jun. 27, 2001.
"Performance Management/400 Offerings and Services, including Performace Management/400–Subset", Version 3, International Business Machines Corporation, Third Edition, Sep. 1994.
Emil Abrascid, Data Manager Online, Copyright 1999.
IBM e–business on demand: the next wave of IT services by IBM Global Services, Jan. 2002.

*Primary Examiner*—Hosuk Song
(74) *Attorney, Agent, or Firm*—Moser, Patterson & Sheridan, LLP

(57) ABSTRACT

Methods and systems for handling physical device placement requests are provided. In general, a physical device placement request is any request for information pertaining to placement of a physical device (e.g., a direct access storage device and a PCI card) in a computer system. Illustratively, a request may specify machine specific information, base system information or purchase order information. The user-supplied request information is then combined with configuration information according to pre-defined rules. The resulting output is placement information which may be returned to the requester.

29 Claims, 13 Drawing Sheets

U.S. PATENT DOCUMENTS

| | | | |
|---|---|---|---|
| 6,138,249 A * | 10/2000 | Nolet | 714/25 |
| 6,170,060 B1 * | 1/2001 | Mott et al. | 713/201 |
| 6,247,128 B1 * | 6/2001 | Fisher et al. | 713/100 |
| 6,289,462 B1 * | 9/2001 | McNabb et al. | 713/201 |
| 6,321,338 B1 * | 11/2001 | Porras et al. | 713/201 |
| 6,510,463 B1 | 1/2003 | Farhat et al. | |
| 6,591,418 B2 * | 7/2003 | Bryan et al. | 717/177 |
| 6,643,654 B1 | 11/2003 | Patel et al. | |
| 6,645,077 B2 * | 11/2003 | Rowe | 463/42 |
| 6,654,891 B1 * | 11/2003 | Borsato et al. | 713/201 |
| 6,708,155 B1 | 3/2004 | Honarvar et al. | |
| 6,714,976 B1 | 3/2004 | Wilson et al. | |
| 6,775,699 B1 | 8/2004 | DeLuca et al. | |
| 6,792,455 B1 | 9/2004 | DeLuca et al. | |
| 6,798,997 B1 * | 9/2004 | Hayward et al. | 399/12 |
| 6,813,248 B1 | 11/2004 | Boss et al. | |
| 2001/0029526 A1 | 10/2001 | Yokoyama et al. | |
| 2002/0052947 A1 | 5/2002 | Duimovich et al. | |
| 2002/0099812 A1 | 7/2002 | Davis et al. | |
| 2002/0147757 A1 | 10/2002 | Day et al. | |
| 2002/0156884 A1 | 10/2002 | Bertram et al. | |

\* cited by examiner

| KEY | VALUE | DESCRIPTION |
|---|---|---|
| MTM | 9406170 | MACHINE TYPE MODEL |
| SN | 0012345 | SERIAL NUMBER |
| VPD | 01/02/07 | VITAL PRODUCT DATA |
| CFG | 00110031 | CONFIGURATION LEVEL |
| T, 5065 | 01C00 | KEY = TOWER . TOWERTYPE<br>VALUE = TOWER LOCATION |
| FC 2722<br>O. 5065. 02L01 . CC08 | 2722<br>2721 | TYPE . TOWERTYPE . TOWERLOCATION . SLOTLOCATION |
| MSG | | START OF CONFIGURATION MESSAGES |
| END | | END OF CONFIGURATION MESSAGES |

*Fig. 3A*

| KEY | VALUE | DESCRIPTION |
|---|---|---|
| MTM | 9406170 | MACHINE TYPE MODEL |
| SN | 00012345 | SERIAL NUMBER |
| VPD | 01/02/07 | VITAL PRODUCT DATA |
| CFG | 00110031 | CONFIGURATION LEVEL |
| T, 5065 | 01C00 | KEY = TOWER . TOWERTYPE<br>VALUE = TOWER LOCATION |
| N. 5065 . 02L01 . CC09<br>O. 5065 . 02L01 . CC08 | 2722<br>2721 | TYPE . TOWERTYPE . TOWERLOCATION . SLOTLOCATION |
| MSG | | START OF CONFIGURATION MESSAGES |
| END | | END OF CONFIGURATION MESSAGES |

*Fig. 3B*

PHYSICAL DEVICE PLACEMENT ASSISTANT

SPECIFY iSERIES OR AS/400 SYSTEM INFORMATION

- ○ ENTER SYSTEM:  [10 ▽] — 404
- ● SELECT BASE SYSTEMS:
- ○ MACHINE EQUIPMENT SPECIFICATION (MES) NUMBER:

(PLANT CODE- SERIAL NUMBER) — 406

MACHINE TYPE: [9406 ▽] — 408

USER TYPE: [CUSTOMER ▽] — 410

[SUMMIT SYSTEM INFORMATION] — 412

Physical Device Placement Assistant

SPECIFY iSERIES OR AS/400 SYSTEM INFORMATION

- ○ ENTER SYSTEM:
- ● SELECT BASE SYSTEMS:
- ○ MACHINE EQUIPMENT SPECIFICATION (MES) NUMBER:

[9406: 10-170BS ▽] (MACHINE TYPE: PLANT CODE-SERIAL NUMBER) — 502

USER TYPE: [CUSTOMER ▽] — 410

[SUBMIT SYSTEM INFORMATION] — 412

— 402 (radio group)
— 500 (window)

PHYSICAL DEVICE PLACEMENT ASSISTANT

SPECIFY iSERIES OR AS/400 SYSTEM INFORMATION

402 —
- ○ ENTER SYSTEM:
- ○ SELECT BASE SYSTEMS:
- ● MACHINE EQUIPMENT SPECIFICATION (MES) NUMBER:

— 602

PLANT OF ORIGIN: ROCHESTER, MN. USA

USER TYPE: CUSTOMER ▽ — 410

— 604

SUBMIT SYSTEM INFORMATION — 412

*Fig. 6*

IBM 5074 I/O EXPANSION UNIT MODEL: 820

[EDIT] [RETURN]

MACHINE TYPE: 9406  SERIAL NUMBER: 0012345
FRAME: 2  VPD DATE: 00/12/21

PCI CARDS
REAR VIEW - LEFT SIDE

| POSITION | POSITION DESCRIPTION | CCIN |
|---|---|---|
| C01 | IOP | 2843 |
| C02 | IOA | 2748 |
| C03 | IOP/IOA | 2838 |
| C04 | IOA | *2749* |
| C05 | IOP/INS | EMPTY |
| C06 | IOA | EMPTY |
| C07 | IOA | EMPTY |
| C08 | HSL - NOT A PCI POSITION | |
| C09 | IOP/IOA | EMPTY |
| C10 | IOA | EMPTY |
| C11 | IOP/INS | EMPTY |
| C12 | IOA | EMPTY |
| C13 | IOA | EMPTY |
| C14 | IOP/IOA | EMPTY |
| C15 | IOA | EMPTY |

REAR VIEW - RIGHT SIDE
PCI CARDS

*Fig. 12*

PHYSICAL DEVICE PLACEMENT ASSISTANT

BACKGROUND OF THE INVENTION

1. Field of the Invention

The present invention generally relates to a method and system for handling physical device placement requests.

2. Description of the Related Art

Installing and configuring computer parts requires timely and updated configuration information. Such information is needed by customers, field customer engineers, business partners and other users and distributors of computer parts. Conventionally, configuration information has been provided in the form of hardcopy information with hardware shipments, hardcopy or soft copy information shipped with the operating system, installing and running configuration tools on a customer system, etc.

However, current efforts to insure meaningful configuration information have proved inadequate. Such inadequacy is a result of a variety of factors including the increasing size of systems and the increasing complexity and varied hardware product offerings available on such systems. Further, parts placement options are varied and complex and are subject to frequent changes in short periods of time. Placement rules are also difficult to learn and are complicated by virtue of interdependencies (i.e., placement of one component can affect placement of additional components).

Therefore, there is a need for methods and systems for providing meaningful and timely configuration information.

SUMMARY OF THE INVENTION

Embodiments of the present invention generally provide methods and systems for physical device placement. One embodiment provides, a physical device placement system for servicing requests for placement information. The system comprises a machine information database containing machine information for a plurality of uniquely identified computers operated by customers of a computer manufacturer and a configuration system in communication with the machine information database. In operation, the configuration system is configured to receive a configuration request from an authorized user for placement information of a specified hardware device in a particular computer having representative machine information in the machine information database and respond with the placement information. At least one type of authorized user is each customer of a computer manufacturer operating a computer represented in the machine information database. Another type of authorized user may be a sales person and field engineer of the computer manufacturer.

In another embodiment, a physical device placement system for servicing requests for placement information comprises a machine information database, a configuration information database, a configuration system, a first network connection between the configuration system and an internet, and a second network connection between the configuration system and a plurality of internal client machines. The machine information database contains machine information for a plurality of uniquely identified computers operated by customers of a computer manufacturer. The configuration information database contains configuration information specifying placement of a plurality of hardware devices in computer systems. The configuration system is in communication with the machine information database and the configuration information database. In operation, the configuration system configured to receive a configuration request from an authorized user for placement information of a specified hardware device in a particular computer having representative machine information in the machine information database and generate the placement information by combining the configuration information and the machine information applicable to the specified hardware device and the particular computer. A response with the placement information is then sent to the authorized user. At least one type of authorized user is each registered customer of the computer manufacturer operating a computer represented in the machine information database. In one embodiment, the physical device placement system comprises a security system configured to restrict access to the configuration system to requests for placement information submitted by authorized users from the internet. The second network connection bypasses the security system to allow access to the configuration system by the plurality of internal client machines.

In another embodiment, a method of servicing requests for physical device placement information is provided. The method comprises receiving, at a physical device placement system, a configuration request from an authorized user for placement information of a specified hardware device in a particular computer having representative machine information in a machine information database. At least one type of authorized user is each customer of a computer manufacturer operating a computer represented in the machine information database. The method further comprises generating the placement information and responding with the placement information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3A is an exemplary interface file input to a configuration server.

FIG. 3B is an exemplary interface file output from a configuration server.

FIG. 4 is an illustrative graphical user interface configured for input of a machine type, plant code and serial number.

FIG. 5 is an illustrative graphical user interface configured for input of a base system.

FIG. 6 is an illustrative graphical user interface configured for input of a purchase order number.

FIG. 12 is an illustrative graphical user interface configured for displaying results of a placement query.

DETAILED DESCRIPTION OF THE PREFERRED EMBODIMENT

The present embodiments provide methods and systems for handling physical device placement requests. In general, a physical device placement request is any request for information pertaining to placement of a physical device (e.g., a direct access storage device and a PCI card) in a computer system.

The following embodiments are described with particular reference to upgrading/enhancing computers. However, the present embodiments are applicable to any physical devices that benefit from periodic upgrades, enhancements or reconfiguration.

Figure 1:
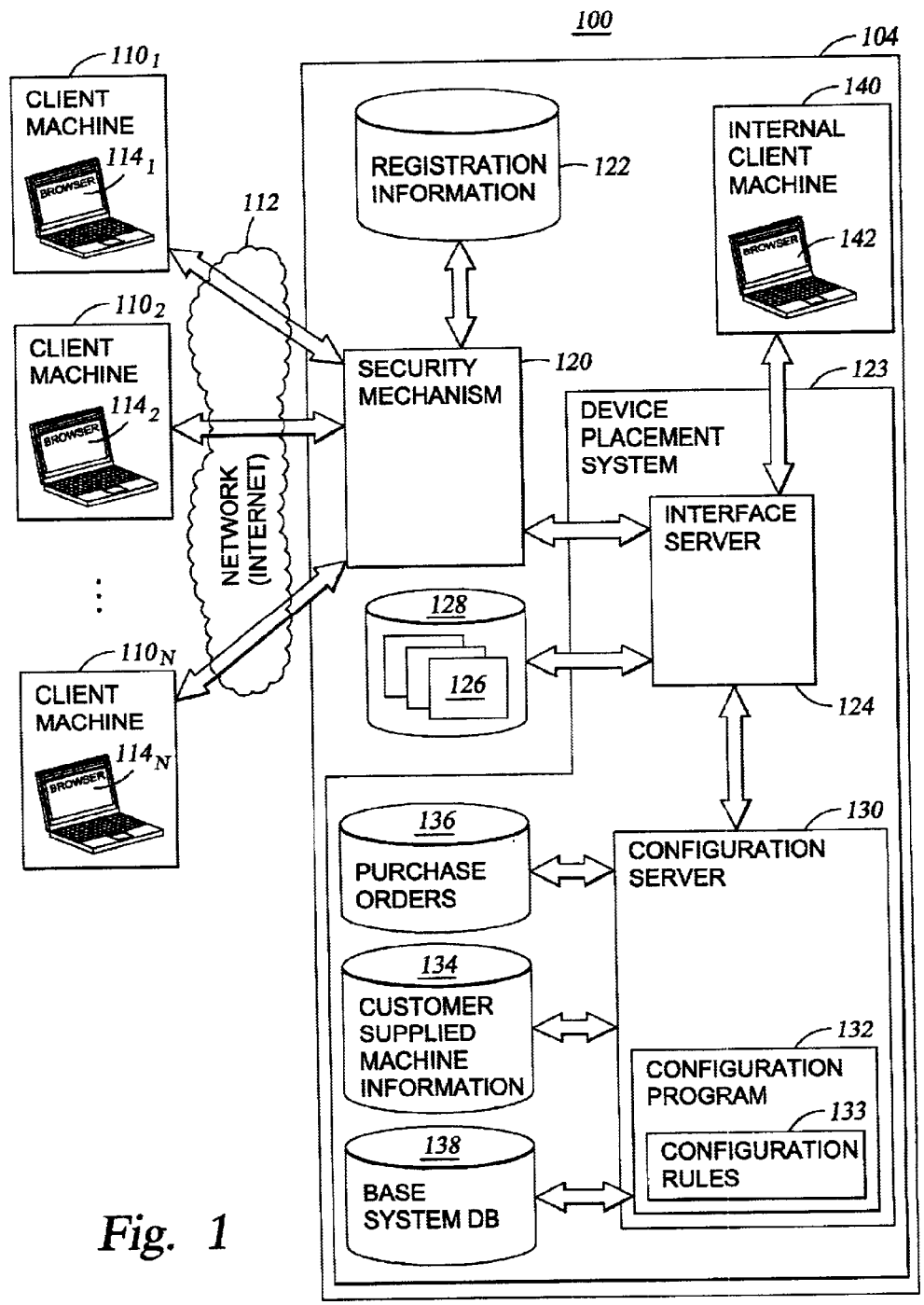
FIG. 1 is an architecture diagram of one embodiment of a physical device placement system.
Figure 2:
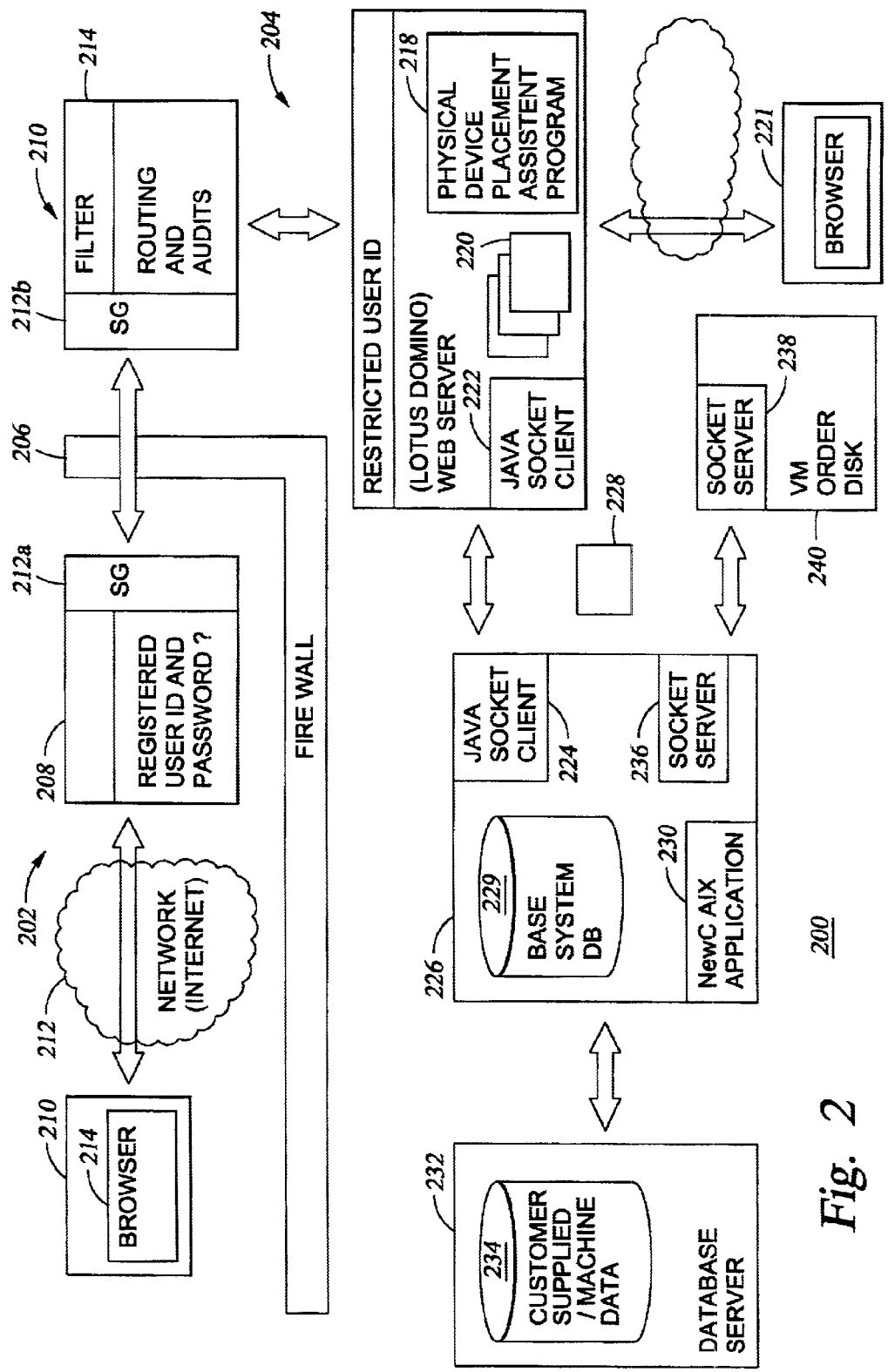
FIG. 2 is an architecture diagram of another embodiment of a physical device placement system.

FIGS. 1 and 2 show embodiments of configuration information data processing systems 100 and 200, respectively. The configuration information data processing systems 100 and 200 are also referred to herein as "system 100" and "system 200", respectively. The system 200 may be understood as a particular embodiment of the system 100. Accordingly, in some cases similar terms are used in describing FIGS. 1 and 2 to indicate similar components. In one embodiment, the systems 100, 200 are configured as Web based systems comprising Web servers navigable by Web browsers. As such, the systems 100, 200 are particularly suited for Internet implementations. However, references to Web applications and the Internet are merely for purposes of illustration and persons skilled in the art will readily recognize that embodiments contemplated herein include any networked arrangement and a method allowing access to configuration information.

Referring first to FIG. 1, the system 100 generally includes a plurality of external client computers $110_1$, $110_2$, ... $110_N$ (collectively referred to herein as "external client computers 110") and a configuration information supplier system 104 (also referred to herein as "supplier system 104"). A network connection is established between the external client computers 110 and the supplier system 104 through a network 112 (also referred to the "external network"). The network 112 may be any local area network (LAN) or wide area network (WAN) capable of supporting the appropriate information exchange according to embodiments provided herein. In a particular embodiment, the network 112 is the Internet.

Each external client computer 110 is shown configured with a browser 114 (only one shown) to allow for navigation of network addresses, including the network address of the supplier system 104. Illustratively, the browser 114 is a Web browser.

At a front end, the supplier system 104 includes a security mechanism 120. The security mechanism 120 may be any combination of hardware and software configured to restrict access to the supplier system 104. In one embodiment, access may be restricted to register users. Accordingly, the supplier system 104 includes a registration information database 122 which is used by the security mechanism 120 to authenticate users requesting access to the supplier system 104. The registration information database 122 may include usernames, user IDs, user physical addresses, user e-mail addresses, user passwords and the like.

The security mechanism in communication with a device placement system 123. In general, the device placement system 123 comprises an interface server 124 and a configuration server 130. The interface server 124 is configured to format interfaces in response to a user request (e.g., from the external client computer 110). The interfaces 126 are stored as a series of electronic documents in an interface database 128. Illustratively, the interfaces 126 are graphical user interfaces (GUI) comprising a number of fields which may be populated with information provided by a configuration server 130 or by information provided from a user, e.g., via a browser 114.

The configuration server 130 (also referred to herein as the "physical device placement server") may be any machine comprising a configuration program 132 which, when executed, performs a hardware device placement process according to a request received from an external client computer 110. The rules for performing the hardware device placement process and generating a meaningful output is contained in a rules file 133. The rules file 133 contains current configuration and placement information (also referred to herein as rules) for a plurality of devices. The rules are specific to a plurality of machines, which may be identified by machine type and model. For each specific machine, the rules identify where a hardware device (e.g., PCI and DASD) is placed and various circumstances regarding the placement. One example of a rules is the proper distribution of DASD devices under PCI media adapters for a specified level of protection. Another example is the distribution of PCI LAN adapters under PCI controller adapters for optimized performance. The rules file 133 may be periodically updated to ensure accurate information.

The information used by the configuration server 130 (and specifically the configuration program 132) to process a request is contained in a plurality of databases. In one embodiment, the databases include a customer machine information database 134, a purchase order database 136 and a base system information database 138.

The customer machine information database 134 contains customer supplied information about specific computers. For each particular computer, such information may include a model number, a machine type, a plant code, hardware information (e.g., for the various devices resident on the computer), software information and the like. Illustratively, the information contained in the customer machine information database 134 may have been manually collected or automatically collected. Automatic machine information collection is well-known. For example, the AS/400 for iSeries available from International Business Machines is configured to sense and collect machine data in response to a predefined command (i.e., WRKORDINF). Regardless of the collection method, the machine data may then be transported to the supplier system 104 and associated with a particular user during registration. In the case of the AS/400, the data is transmitted from an external client computer 110 in response to a user-initiated command, i.e., the WRKORDINF command. It should be noted that that the customer machine information may be specific to a machine different from the machine used to later invoke the hardware device placement process of the present embodiments.

The purchase orders database 136 provides a repository for pending purchase orders (also referred to herein as "Miscellaneous Equipment Specifications" (MES)). Each purchase order may be referenced by a purchase order number. Each purchase order may contain order content specifying a part(s) to be added to an existing machine. For example, the order content may include part names, a part number, a machine type, a serial number and other identifying information.

The base system information database 138 contains "templates" for a variety of different systems. Each template defines the specification of a particular system. The templates allow a user to perform "what if" scenarios for various devices using the same base system information or for various base systems using the same device.

In one embodiment, device configuration requests may also be submitted from an internal client computer 140. The internal client computer 140 executes a browser (e.g., a Web browser) in order to communicate with the interface server 124. However, because the internal client computer 140 resides "behind" the security mechanism 120, a user of the internal client computer 140 may not be subject to the same restriction requirements as a user of the external client computers 110.

In operation, the configuration information supplier system 104 responds to requests for configuration/placement information of hardware devices. Such devices may include, for example, PCI cards and DASDs. The requests are submitted from registered users by either the external client computers 110 or the internal client computers 140. In the former case, users are subject to an authentication process as implemented by the security mechanism 120. For example, a user may be required to provide a user ID and password.

Submission of requests is facilitated by providing users the interfaces 126 via the interface server 124. The interfaces 126 may include one or more request interfaces comprising a number of fields. The interfaces are transmitted to the browser 114 and a user then inputs required information into the fields and submits the information to the supplier system 104. Illustrative embodiments of a graphical user interface configured for submission of a configuration request are described below with reference to FIGS. 4–6.

A request received by the supplier system 104 is then forwarded to the configuration server 130 for processing. In particular, the configuration program 132 operates to retrieve the appropriate information from the rules file 133, while the configuration server 130 retrieves information from the databases 134,136 and/or the base system database 138. The particular information retrieved will depend upon the nature of the request. In one embodiment, requests include machine-specific requests, base system requests and a purchase order number request. These requests will be described in more detail with reference to FIGS. 7–11 below. Regardless of the request type, steps are taken by the configuration server 130 to associate the appropriate information from the databases 134, 136 and 138 and output the information to the interface server 124. The information is then transmitted to the user for display via the browser 114, 142.

Referring now to FIG. 2, the system 200 generally includes an external environment 202 and a configuration information supplier system 204 (also referred to herein as "supplier system 204"). The external environment 202 and a supplier system 204 may be separated by an information access partition 206. Generally, the information access partition 206 may be any combination of hardware and software. Illustratively, the information access partition 206 is a firewall.

The external environment 202 includes an external server 208 and a plurality of external client computers $210_1$, $210_2$, ... $210_N$ (collectively referred to herein as "external client computers 210"). In general, the external server 208 is configured to prompt a user for a user ID and password as previously specified during a registration time. A network connection is established between the external server 208 and the external client computers 210 through the network 212. The network 212 may be any local area network (LAN) or wide area network (WAN) capable of supporting the appropriate information exchange according to embodiments provided herein. In a particular embodiment, the network 212 is the Internet. The external client computer 210 is shown configured with a browser 214 to allow for navigation of network addresses, including the network address of the external server 208. Illustratively, the browser 214 is a Web browser and the external server 208 is a Web server.

The external server 208 communicates with an internal server 210 residing on an opposite side of the partition 206. Illustratively, communication between the external server 208 and the internal server 210 is maintained by a Secure Gateway Interface (SGI) connection supported by SGI interfaces 212a–b. A connection is established only after a user has been authenticated by the external server 208. Following authentication, the internal server 210 may filter and redirect network address requests to prevent users from accessing unauthorized databases or network addresses and from determining the internal directory structure of the configuration information supplier system 204. These and other security features may be implemented by a filter program 214.

Configuration requests are transmitted from the internal server 210 to a technical support Web server 216. Illustratively, the Web server 216 is a Lotus Domino Web server. The Web server 216 hosts a physical device placement assistant application 218 and a plurality of electronic documents 220. The electronic documents 220 contained graphical user interface placement information, diagrams, charts and the like. The physical device placement assistant application 218 allows users to access the Web server 216 without being prompted for additional user identification information (e.g., user ID and password), while restricting access to the electronic documents 220 via, e.g., reader fields. As the electronic documents 220 are created by the physical device placement assistant application 218, reader fields within each document are tagged with the user ID of the requester. In this manner, access to the electronic documents 216 is limited to the appropriate user.

In addition to servicing requests from the external client computers 210, the Web server 216 also services requests from internal users, as represented by the internal client computer 221. The internal client computer 221 may be any computer residing inside the firewall 206, i.e., on the same side as the Web server 216.

Regardless of the original source of a configuration request, the requests are forwarded from the Web server 216 to a physical device placement assistant hub 226. The Web server 216 maintains a connection with the physical device placement assistant hub 226 via a Java socket client 222 residing on the Web server 216 and a Java socket server 224 residing on the hub 226. Transmission of data between the socket client 222 and the socket server 224 is in the form of a uniquely defined socket server interface file 228. One embodiment of the interface file 228 is described below with reference to FIGS. 3A–3B.

Once a request is received by the physical device placement assistant hub 226, steps are taken to prepare a response. In particular, an input order is prepared by the hub 226 and then provided to a configuration program 230. Illustratively, the configuration program 230 is NewC, available from International Business Machines, Inc. for iSeries and pSeries hardware. The input order is prepared to using data provided from one of a plurality of sources. Illustrative sources include a base system information database 229 (managed by the hub 226), customer/machine supplied database 234 (managed by a database server 232) and a VM order minidisk 240 (containing purchase orders/MES orders). A request to the database server 232 may be in the form of an SQL query submitted via a Java JDBC through DB2 client access enabler (CAE) connection. Communication between the hub 226 and the VM order minidisk 240 is made via a socket connection maintained by a socket client 236 residing on the hub 226 and a socket server 238 residing on the VM order minidisk 240. Once prepared, the response is sent to the requester via the interface file 228.

One embodiment of the interface file 228 is described with brief reference to FIG. 3A–3B. FIG. 3A shows a format of the interface file 228 when input to the configuration server 130 and is referenced as interface file 228A. FIG. 3B shows a format of the interface file 228 when output from the configuration server 130 and is referenced as interface file 228B. In general, the interface file 228A–B is defined as a plurality of columns and rows. Illustratively, the interface format is a physical device placement assistant format. The format consists a key/value pairs that represent a current system configuration. Accordingly, the interface file 228A–B comprises a key column 302 and a value column 304. A description column 306 is also provided and contains an intuitive description of the key/value pair. The collective entries of a particular row define a record of the interface file 228. A sixth record 308 of the interface file 228 contains a first character string 310A–B and a second character string 312. The first character string 310A–B is representative of "new" or customer supplied data (i.e., data supplied in a present request) whereas the second character string 312 is representative of "old" data (data previously provided by a user/machine and now retrieved from a data repository, e.g., the database 234). The information type (i.e., old or new) is indicated by a first character, "N" and "O", in the character strings. In the case of the first character string 310A–B, the input interface file 228A contains a representation of the customer supplied data (a feature code) which is converted into a different format in the output interface file 228B.

FIGS. 4–6 show illustrative embodiments of graphical user interfaces (GUIs) configured for facilitating a configuration request. In particular, the GUIs are illustrative of the electronic documents 126 (FIG. 1) and/or the electronic documents 220 (FIG. 2). Referring first to FIG. 4, a GUI 400 is shown. The GUI 400 comprises a search selection window 402. The search selection window 402 provides user selectable search options. Illustratively, the search options include a machine specific search, a base system search, and an MES search. In this case, a machine specific search has been selected. As a result of the selection, the GUI 400 provides a plant code field 404, a serial number entry 406, a machine field entry 408 and a user type field 410. Once the appropriate information has been selected or entered the user may submit the request by clicking on the "Submit System Information" button 412.

FIG. 5 shows a GUI 500 configured for a base system configuration request. In this case, the GUI 500 includes a base system field 502. A GUI 600 configured for an MES search is shown in FIG. 6. In this case, the GUI 600 includes an MES number field 602 and a "plant of origin" field 604.

Figure 7:
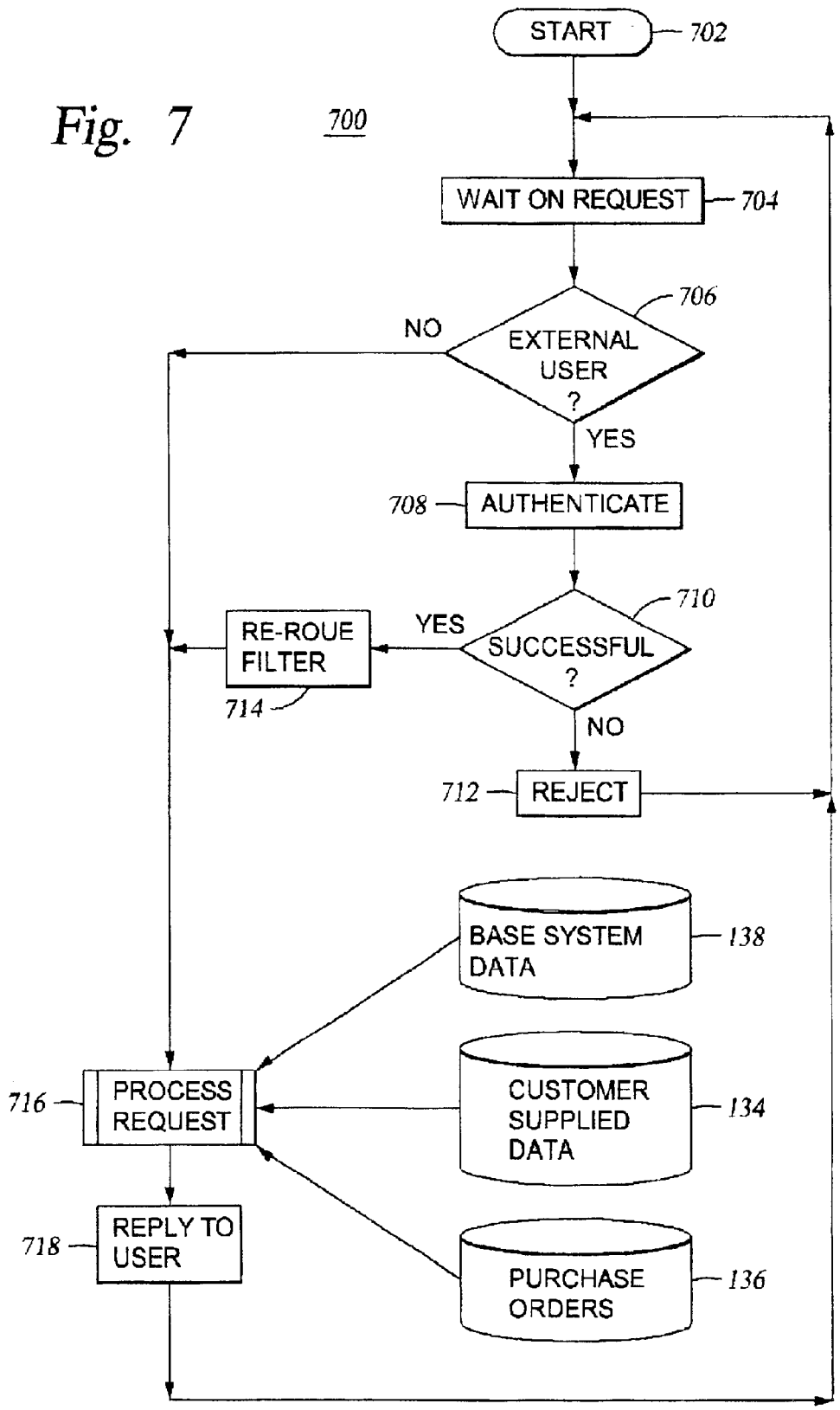
FIG. 7 is a flowchart illustrating a method for handling device placement requests.

Referring now to FIG. 7, a method 700 is shown illustrating steps taken to process a configuration/placement request. In one embodiment, the method 700 may be understood as illustrating the operation of the systems 100 and 200. Accordingly, reference may be made to FIG. 1 and 2 where appropriate. For brevity and simplicity, reference to FIG. 1 is emphasized. However, person skilled any art will recognize where the following steps are applicable to the system 200 described with reference to FIG. 2.

Method 700 is entered at steps 702 and proceeds to step 704 to wait on a request. Once a request is received, the method 700 proceeds to step 706 and queries whether the request is from an external user. If so, steps are taken to first authenticate the user. Accordingly, the method 700 proceeds to step 708 where authentication takes place. At steps 710, the method 700 queries whether the authentication was successful. If not, the request is rejected at steps 712 in the method 700 returns to step 704 to wait on another event. If, however, the authentication is successful the method 700 proceeds to step 714 where the request may be rerouted and filtered. The request is then processed according to the particular request type at step 716. Depending on the request type, one or more of the databases 134, 136 and 138 are accessed. At step 718, a response is submitted to the requester. The method 700 then returns to step 704 to wait on another event.

Figure 8:
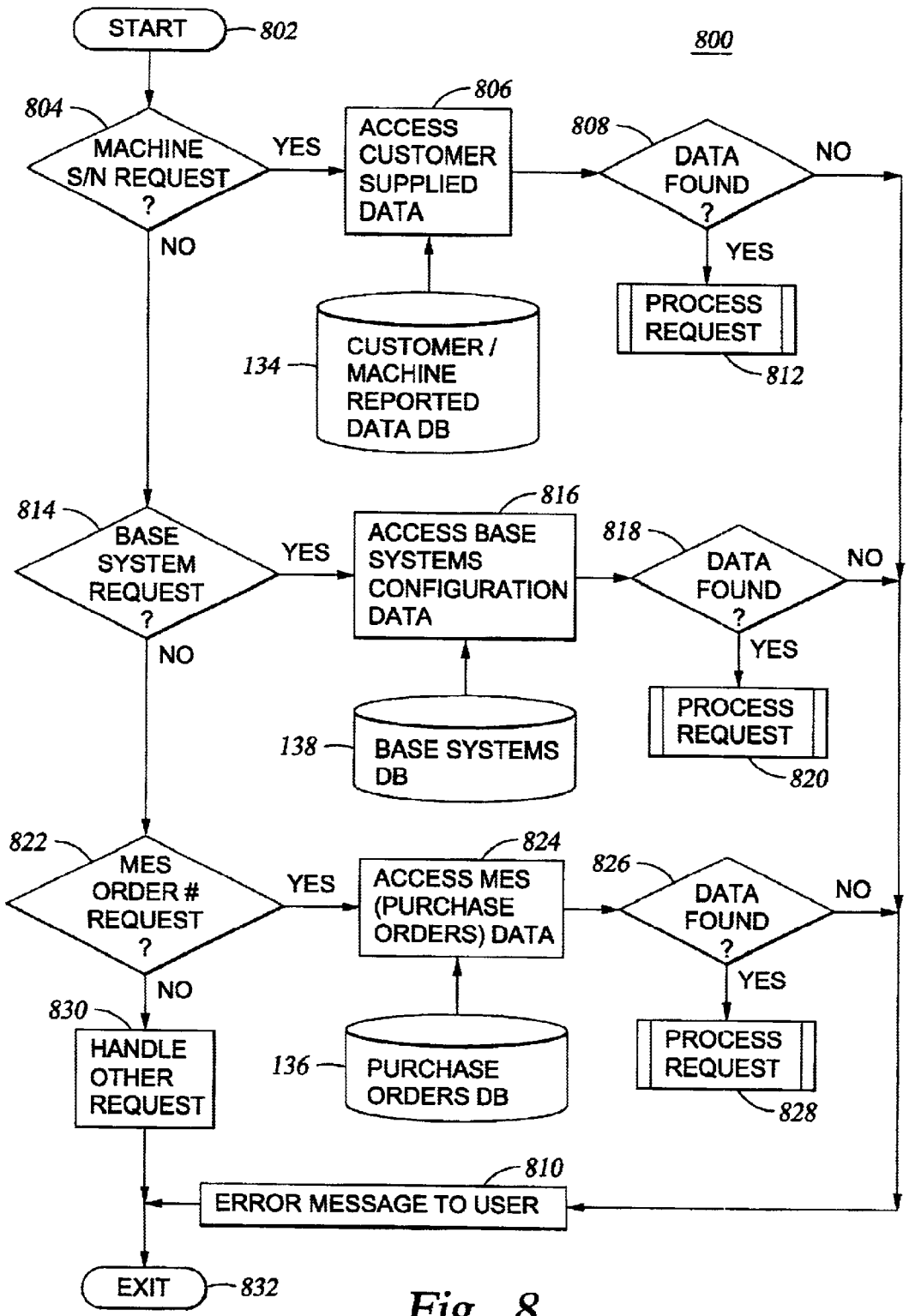
FIG. 8 is a flowchart illustrating a method for handling device placement requests introduced in FIG. 7.

FIG. 8 shows a method 800 for processing various request types at step 716. Method 800 is entered at step 802 and proceeds to step 804 to query whether the request is a machine specific request. That is, a determination is made as to whether a user has submitted a machine type, a plant code and a serial number. If so, the customer/machine supplied database 134 is accessed at step 806. At step 808, the method 800 queries whether data was found for the particular machine. If the user has not previously provided the data been no data is located at step 808 and an error message provided to the user at step 810. If the appropriate data is located at step 808, the method 800 proceeds to step 812 where a response is prepared. One embodiment of step 812 is described below with reference to FIG. 9.

Returning to step 804, if the request is not for a specific machine the method 800 proceeds to step 814 and queries whether the request is a base system request. If so, the method 800 proceeds to step 816 to access the base system database 138 in an attempt to locate the appropriate data. At step 818, the method queries whether the data was located. If not, an error message is provided to the user at step 810. Otherwise, the method 800 proceeds to step 820 where a response is prepared. One embodiment of step 820 is described below with reference to FIG. 10.

Returning again to step 814, if the request is not a base system request the method 800 proceeds to step 822 and queries whether the request is an MES order number request. If so, the purchase orders database 136 is accessed at step 824 in an attempt to locate the appropriate data. At step 826, the method 800 queries whether the data was located. If not, the requester is provided with an error message at step 810. Otherwise, the method 800 proceeds to step 828 to prepare a response. One embodiment of step 828 is described below with reference to FIG. 11.

If steps 804, 814 and 822 were each entered negatively, the method 800 proceeds to step 830 to handle other request types according to predefined rules. Examples of requests which may be handled at step 830 include requests to view help information, display error messages, jump to other Web pages view hyperlinks, etc. The method 800 then exits at step 832.

Figure 9:
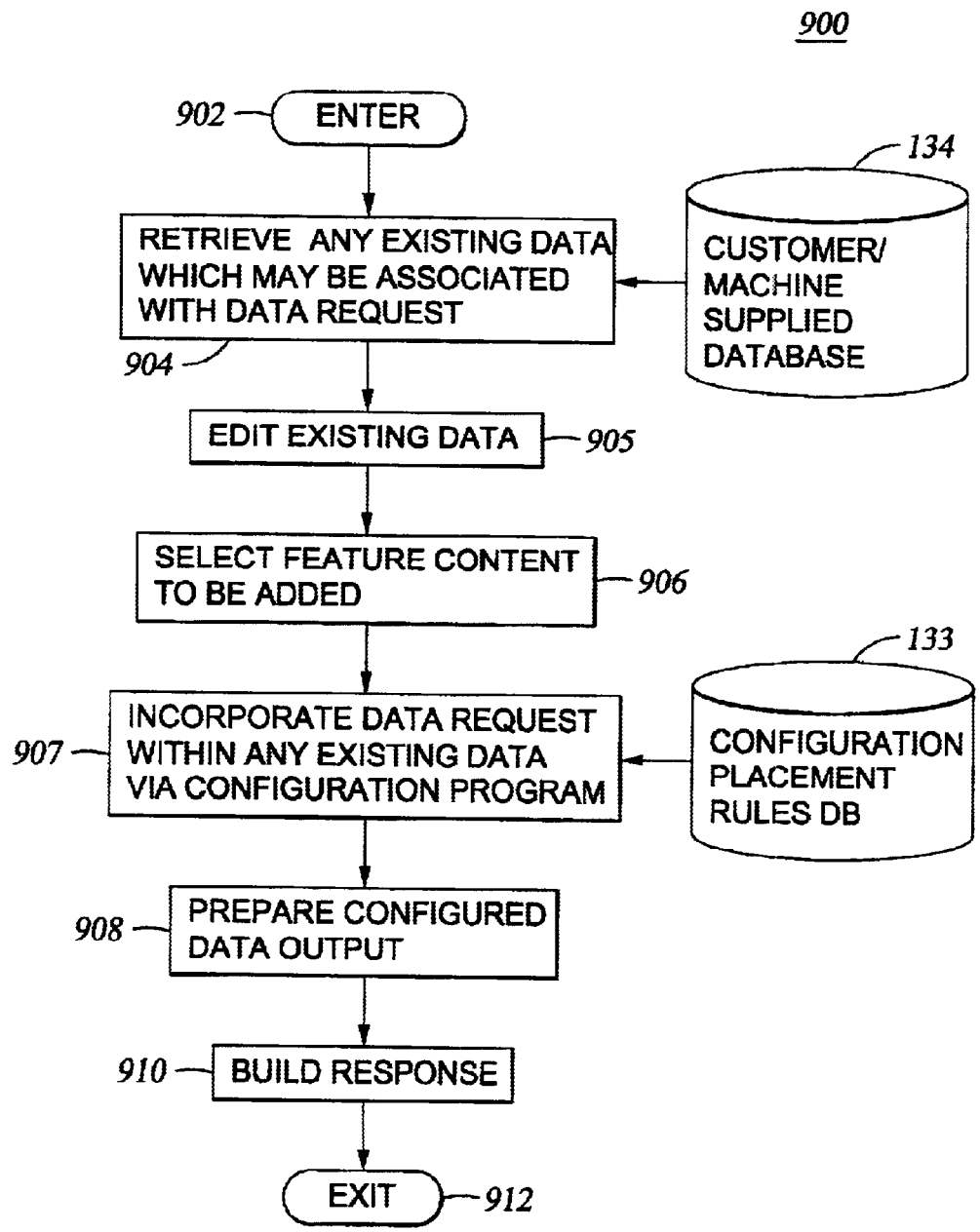
FIG. 9 is a flowchart illustrating a method for handling a machine specific device placement request using customer supplied data.

FIG. 9 shows one embodiment of the processing occurring at step 812. The method 900 is entered at step 902 and proceeds to step 904 to prepare any existing data which may be associated with the data request. Such data includes any information retrieved from the customer/machine reported database 134. At step 905, the user is given the opportunity to edit the existing data. At step 906, the user may select additional feature content. At step 907, the existing data (including any edits an/or additional features) is combined with the new data submitted by the user in the current request. This combination of data is handled by the configuration program 132 which makes use of configuration placement rules contained in the rules file 133. The configured data output is prepared at step 908 and a response is built at step 910. The user may then choose to iterate the foregoing steps or exit at step 912.

Figure 10:
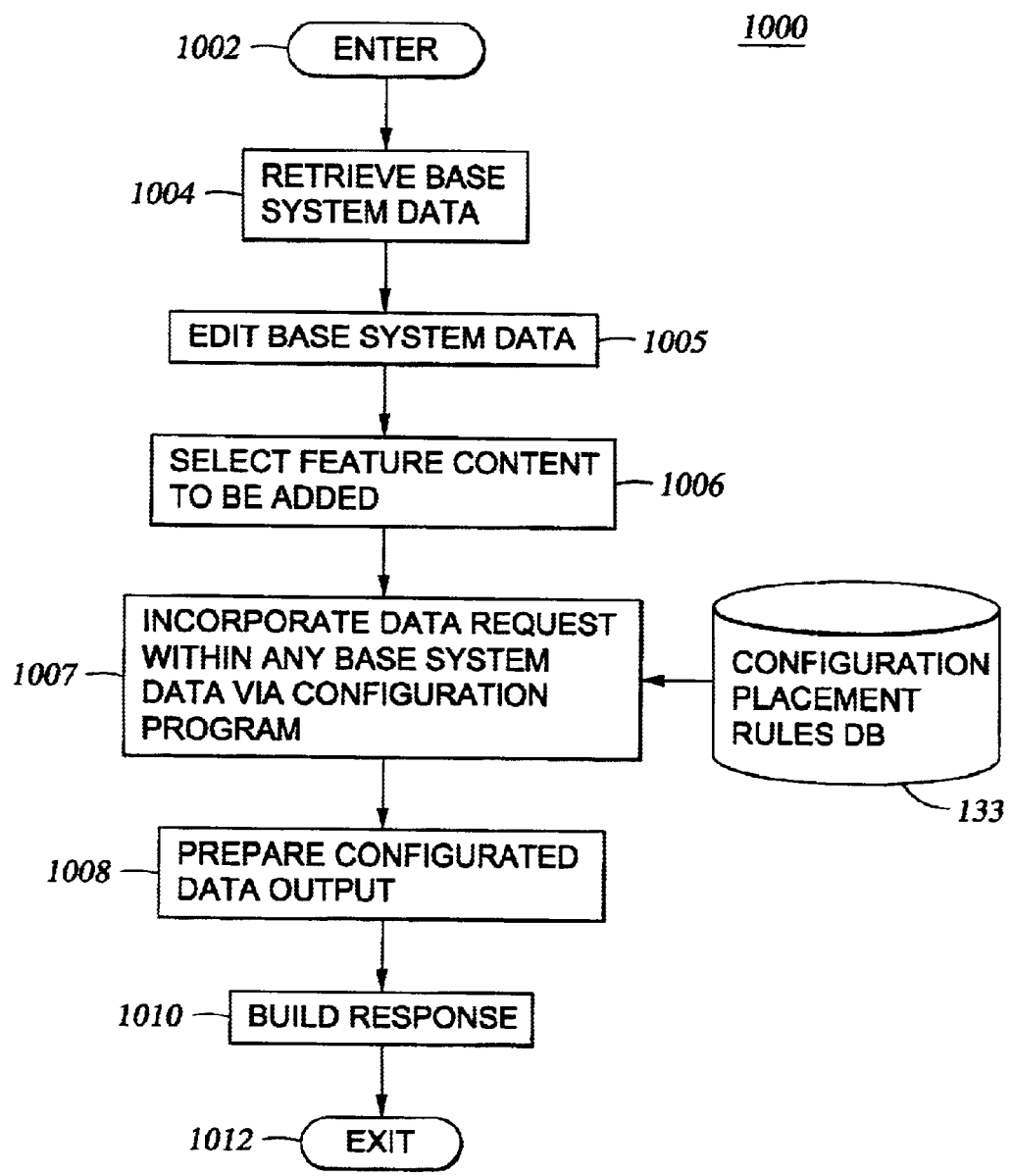
FIG. 10 is a flowchart illustrating a method for handling a base system request type.

FIG. 10 shows a method 1000 illustrating the processing occurring at step 820 (i.e., handling of a base system request). Base system requests handled by method 800 allow a user to perform "what if" scenarios. As such method 1000 may be iterated for various devices using the same base system information or for various base systems using the same device. The method 1000 is entered at step 1002 and proceeds to step 1004 where the base system data is prepared. At step 1005, the user is given the opportunity to edit the existing data. At step 1006, the user may select additional feature content. At step 1007, the existing data (including any edits an/or additional features). Using the configuration placement rules the base system data is incorporated with the data supplied by the current request at step 1006. The configured data output is prepared at step 1008 and a response is built at step 1010. The method 1000 then exits at step 1012.

Figure 11:
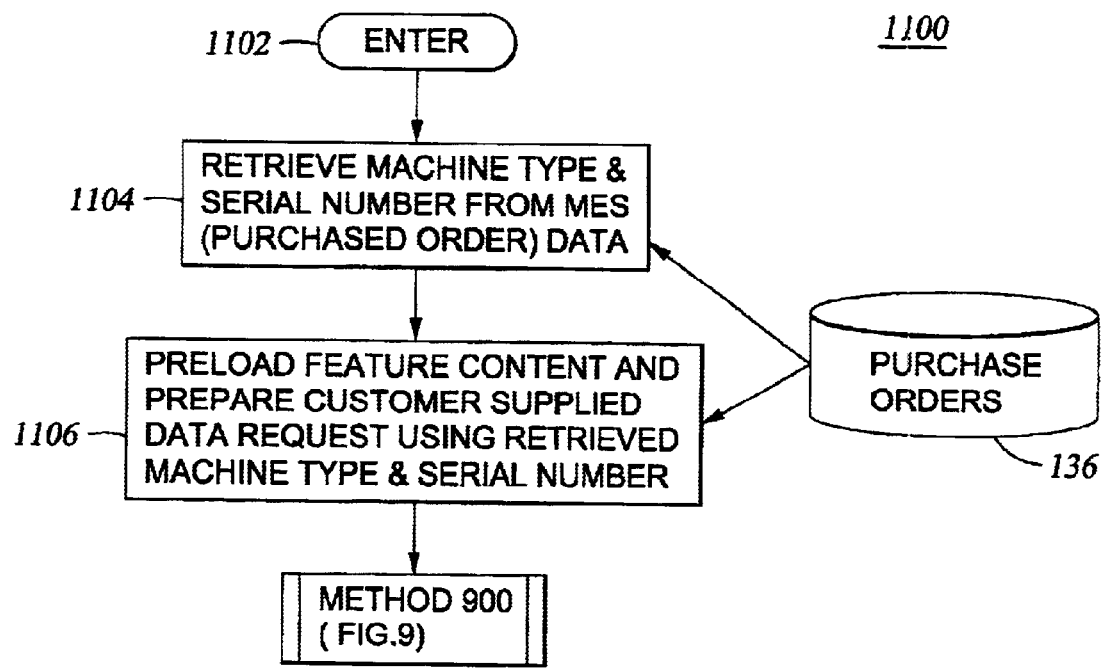
FIG. 11 is a flowchart illustrating a method for handling a purchase order request type.

FIG. 11 shows a method 1100 illustrating the processing occurring at step 828 (i.e., handling of an MES order number request). The method 1100 is entered at step 1102 and proceeds to step 1104 to retrieve the machine type and serial number from the purchase order database 136 according to the user specified MES order number. At step 1106, feature content is preloaded and a request is prepared using the retrieved machine type and serial number. In particular, data may be retrieved from the customer supplied database 134. In this manner, a machine specific request is created without requiring the user to input the machine type and serial number. Accordingly, the request prepared at step 1106 may be handled according to method 900 described above with reference to FIG. 9.

For each configuration request type, a response containing configuration and placement information is returned to the user. FIG. 12 shows one embodiment of a GUI 1200 configured with placement information in response to an MES type request. In particular, the GUI 1200 indicates the placement of a new 2749 IOA PCI card (obtained from the MES order content) within the second 5074 frame (obtained from the customer/machine supplied data) on the system specified by the particular machine type, model and serial number.

While the foregoing is directed to embodiments of the present invention, other and further embodiments of the invention may be devised without departing from the basic scope thereof, and the scope thereof is determined by the claims that follow.

What is claimed is:

1. A physical device placement system for servicing requests for placement information, comprising:
   a machine information database containing machine information for a plurality of uniquely identified computers operated by customers of a computer manufacturer; and
   a configuration system in communication with the machine information database and configured to;
      receive a configuration request from an authorized user for placement information of a specified hardware device in a particular computer having representative machine information in the machine information database, wherein at least one type of authorized user is each of a plurality of customers of a computer manufacturer operating a computer represented in the machine information database;
      in response to the configuration request, generating the placement information using the representative machine information; and
      respond with the placement information, wherein the placement information comprises hardware installation information pertaining to the installation of the specified hardware device in the particular computer.

2. The system of claim 1, wherein each of a plurality of customers is registered with an operator of the physical device placement system.

3. The system of claim 1, further comprising:
   a network connection between the configuration system and the Internet, wherein the configuration system receives the requests for placement information from the Internet; and
   a configuration information database accessible by the configuration system and containing configuration information specifying placement of a plurality of hardware devices in computer systems.

4. The system of claim 1, wherein the configuration system maintains a network connection with the Internet and receives the requests for placement information therefrom.

5. The system of claim 1, wherein the machine information database contains machine reported information for the plurality of uniquely identified computers.

6. The system of claim 1, further comprising a purchase order database containing a plurality of purchase orders each containing a machine type descriptor and a serial number.

7. The system of claim 1, further comprising a configuration information database accessible by the configuration system and containing configuration information specifying placement of a plurality of hardware devices in computer systems.

8. The system of claim 7, wherein the configuration system is configured to generate the placement information by combining the configuration information and the machine information applicable to the specified hardware device and the particular computer.

9. The system of claim 7, wherein the configuration system comprises:
   a first server configured for establishing a first network connection with a plurality of client machines each configured to transmit requests for placement information to the first server;
   a second server having a second network connection with the first server;
   an access partition between the first server and the second server; and configured to restrict information flow from the first sever to the second server; and
   a physical device placement server in communication with the configuration information database and the machine information database.

10. The system of claim 9, wherein the access partition comprises a firewall.

11. The system of claim 1, further comprising a security system configured to restrict access to the configuration system to requests for placement information submitted by authorized users from an external network.

12. The system of claim 11, wherein the external network is the Internet.

13. The system of claim 11, further comprising a plurality of internal client machines having a network connection with the configuration system, wherein the network connection bypasses the security system and wherein the configuration system is further configured to process requests for placement information from the plurality of internal client machines.

14. A physical device placement system for servicing requests for placement information, comprising:
   a machine information database containing machine information for a plurality of uniquely identified computers operated by customers of a computer manufacturer;
   a configuration information database containing configuration information specifying placement of a plurality of hardware devices in computer systems
   a configuration system in communication with the machine information database and the configuration information database and configured to:
      receive a configuration request from an authorized user for placement information of a specified hardware device in a particular computer having representative machine information in the machine information database, wherein at least one type of authorized user is each registered customer of a computer manufacturer operating a computer represented in the machine information database;
      generate the placement information by combining the configuration information and the machine information applicable to the specified hardware device and the particular computer; and
      respond with the placement information, wherein the placement information comprises hardware installation information pertaining to the installation of the specified hardware device in the particular computer;
   a first network connection between the configuration system and the Internet, wherein the configuration system receives the requests for placement information from the internet;
   a security system configured to restrict access to the configuration system to requests for placement information submitted by authorized users from the Internet; and
   a second network connection between the configuration system and a plurality of internal client machine, wherein the second network connection bypasses the security system and wherein the configuration system is further configured to process requests for placement information from the plurality of internal client machines.

15. The system of claim 14, wherein the machine information database contains machine reported information for the plurality of uniquely identified Computers.

16. The system of claim 14, further comprising a purchase order database containing a plurality of purchase orders each containing a machine type descriptor and a serial number.

17. The system of claim 14, wherein the configuration system comprises:
   an internal server configured for establishing a third network connection with an external server, wherein the external server is configured to establish a fourth network connection with a plurality of external client machines; and wherein the security system comprises a firewall between the internal server and the external server and is configured to restrict information flow from the internal server and the external server; and
   a physical device placement server in communication with the internal server, the configuration information database and the machine information database.

18. The system of claim 17, wherein the configuration system further comprises an interface server connected to the internal server and the physical device placement server and configured to host a plurality of graphical user interfaces for display only to authorized users.

19. A method of servicing requests for physical device placement information, comprising:
   receiving machine information from a particular computer, the machine information being particular to the particular computer;
   storing the machine information in a machine information database;
   receiving, at a physical device placement system, a configuration request from an authorized user for placement information of a specified hardware device in the particular computer, wherein at least one type of authorized user is each customer of a computer manufacturer operating a computer represented in the machine information database; and
   in response to the configuration request:
      generating the placement information, wherein generating comprises:
         retrieving the machine information specific to the particular computer using a machine type descriptor and a serial number of the particular computer;
         retrieving configuration information specifying placement of the specified hardware device in the particular computer; and
         combining at least the retrieved machine information and configuration information; and
      responding with the placement information, wherein the placement information comprises hardware installation information pertaining to the installation of the specified hardware device in the particular computer.

20. The method of claim 19, wherein another type of authorized user comprises one of a sales person and a field engineer of the computer manufacturer.

21. The method of claim 19, wherein receiving the configuration request comprises receiving the configuration request via the Internet.

22. The method of claim 19, wherein receiving the configuration request comprises receiving the configuration request from one of an internal client computer and an external client computer.

23. The method of claim 19, wherein generating the placement information further comprises:
   retrieving a purchase order comprising the machine type descriptor and the serial number for the particular computer.

24. The method of claim 19, further comprising authenticating the authorized user before generating the placement information.

25. A physical device placement system for servicing requests for placement information, comprising:
   a machine information database containing machine information for a plurality of uniquely identified computers operated by customers of a computer manufacturer; and a configuration system in communication with the machine information database and configured to:
  receive a configuration request from an authorized user for placement information of a specified hardware device in a particular computer having representative machine information in the machine information database, wherein at least one type of authorized user is each of a plurality of customers of a computer manufacturer operating a computer represented in the machine information database; and
  respond with the placement information; and
a configuration information database accessible by the configuration system and containing configuration information specifying placement of a plurality of hardware devices in computer systems, wherein the configuration system is configured to generate the placement information by combining the configuration information and the machine information applicable to the specified hardware device and the particular computer.

26. A method of servicing requests for physical device placement information, comprising:
  receiving, at a physical device placement system, a configuration request from an authorized user for placement information of a specified hardware device in a particular computer having representative machine information in a machine information database, wherein at least one type of authorized user is each customer of a computer manufacturer operating a computer represented in the machine information database;
  generating the placement information, wherein generating the placement information comprises retrieving machine information specific to the particular computer and retrieving configuration information specifying placement of the specified hardware device in the particular computer; and
  responding with the placement information.

27. The method of claim 26, wherein generating the placement information further comprises combining the configuration information and the machine information.

28. The method of claim 26, wherein the machine information is reported by the particular computer.

29. A method of servicing requests for physical device placement information, comprising:
  receiving, at a physical device placement system, a configuration request from an authorized user for placement information of a specified hardware device in a particular computer having representative machine information in a machine information database, wherein at least one type of authorized user is each customer of a computer manufacturer operating a computer represented in the machine information database;
  generating the placement information, wherein generating the placement information comprises:
    retrieving a purchase order comprising a machine type descriptor and a serial number for the particular computer;
    retrieving the representative machine information specific to the particular computer using the machine type descriptor and the serial number; and
    combining the machine information and configuration information that specifies placement of the specified hardware device in the particular computer; and
  responding with the placement information.

* * * * *